United States Patent [19]

Appling

[11] 4,346,954
[45] Aug. 31, 1982

[54] CONNECTOR FOR ELONGATED UNDERWATER TOWED ARRAY

[75] Inventor: James Appling, Canoga Park, Calif.

[73] Assignee: The Bendix Corporation, Sylmar, Calif.

[21] Appl. No.: 137,934

[22] Filed: Apr. 7, 1980

[51] Int. Cl.³ ............................................. H01R 13/62
[52] U.S. Cl. .............................. 339/89 M; 339/117 R; 367/154
[58] Field of Search ............ 339/89, 90, 94 R, 94 CM, 339/117; 367/154

[56] References Cited

U.S. PATENT DOCUMENTS

| | | | |
|---|---|---|---|
| 3,233,202 | 2/1966 | Kyle | 339/89 R X |
| 3,997,230 | 12/1976 | Secretan | 367/154 X |
| 4,003,620 | 1/1977 | O'Brien et al. | 339/94 R X |
| 4,073,562 | 2/1978 | Karlskind | 339/117 P |
| 4,154,496 | 5/1979 | Gallagher | 339/89 R |

Primary Examiner—Joseph H. McGlynn
Assistant Examiner—Frank H. McKenzie, Jr.
Attorney, Agent, or Firm—Robert C. Smith; William F. Thornton

[57] ABSTRACT

An underwater connector for electrically and mechanically connecting elongated sections of a towed sonar array and the like includes male and female connector sections terminating array sections, each connector section including a lightweight bulkhead member sealed thereto, one of said bulkhead members including a pair of miniature check valves which are oppositely directed and the other including a fill port for filling the array section to which it is attached with a suitable acoustic liquid. Each of said bulkhead members includes a central aperture supporting one half of an electrical connector. Axially displaced from each bulkhead member in each connector section is a strength member support to which is attached a plurality of high strength ropes which carry the tensile load on the array. These strength member supports are fastened against the force from the ropes by means of retaining rings. The male connecting member includes external threads which cooperate with a collar carried on the female connector section having internal threads and an internally directed shoulder. A shear ring is positioned between this shoulder and an external shoulder on the female connector section such that when the collar is threadedly engaged with the male connector member, the shear ring is compressed between the shoulders tightly fastening the connector halves together. A plurality of index pins prevent relative rotation of the connector sections and of the bulkhead members in the connector sections.

6 Claims, 2 Drawing Figures

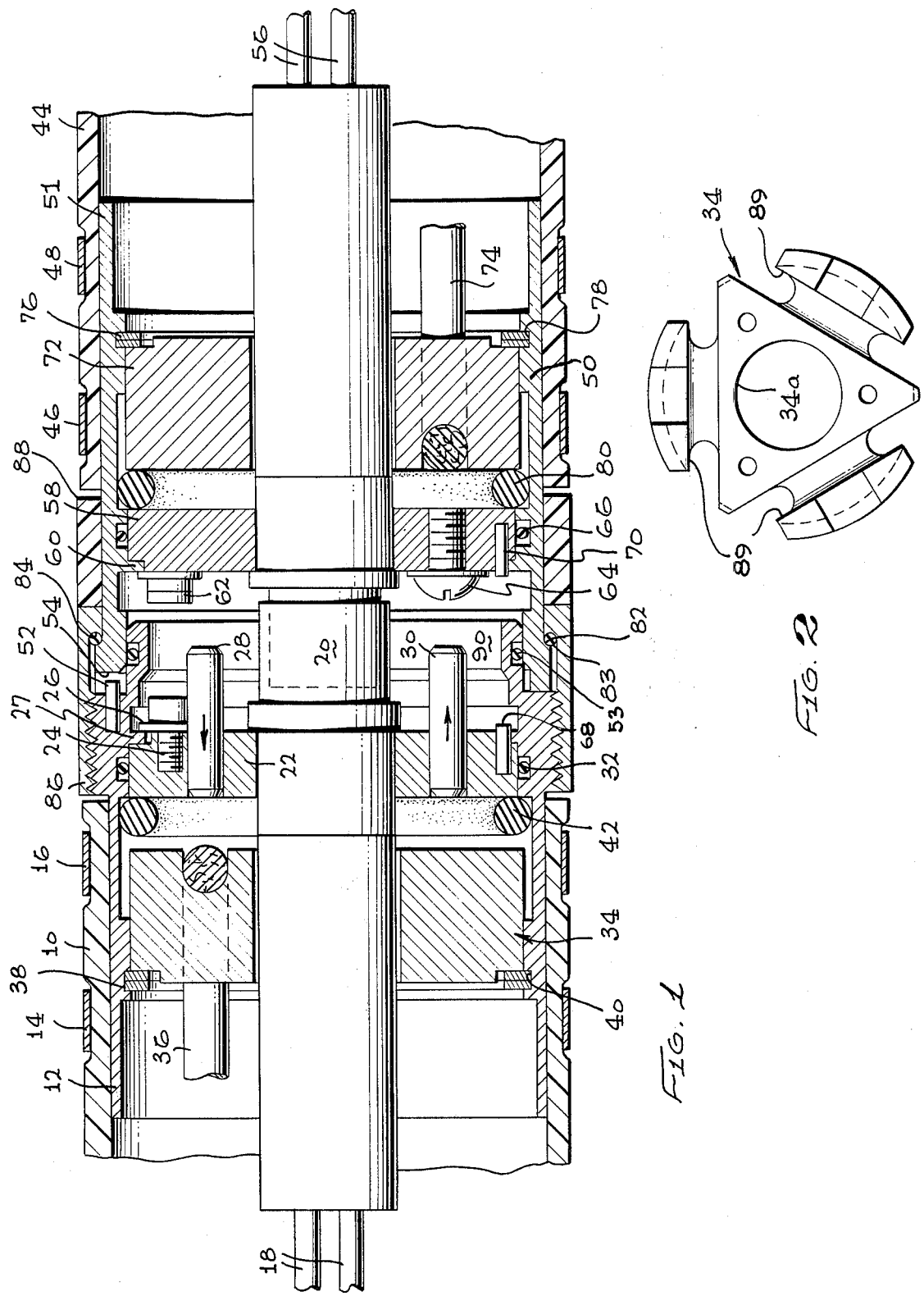

CONNECTOR FOR ELONGATED UNDERWATER TOWED ARRAY

The invention herein described was made in the course of or under a contract with the U.S. Navy Department.

BACKGROUND OF THE INVENTION

Certain elongated towed sonar arrays consist of a series of interconnected modules, and there is a need for a connector for electrically and mechanically connecting individual modules together. Such arrays may consist of several sections, each of which may be of the order of thirty meters in length. In total, such arrays may be a few hundred meters long, requiring a fairly strong force to tow the array even though the sections are neutrally buoyant or nearly so. Each connector must be able to withstand the towing forces imposed. It is also important that each connector be as light as possible so that the towed array is not caused to sag appreciably at the connectors, thus increasing the towing load and possibly also increasing the water noise which would tend to degrade the reception of sonar signals. The connectors should be relatively easy and convenient to assemble and disassemble, they should preferably include means for preventing undesired radial movement between connector halves, they should effectively prevent leakage of sea water into the array, and the construction should effectively prevent tension loading on the electrical wiring and electrical connector.

SUMMARY OF THE INVENTION

The connector structure described herein meets the above requirements and includes telescoping male and female connector sections, each terminating a section of an acoustic array including a flexible hose carrying electrical wiring, hydrophones, and various items of electronic equipment. The flexible hose is clamped to an extended cylindrical section of each connector section. Each connector half carries a lightweight bulkhead member sealed to its interior having a central port supporting half of the electrical connector. One of the bulkhead members includes a pair of oppositely directed check valves to substantially equalize the fluid pressure across the bulkheads. The other bulkhead carries a fill port and means for opening and closing the fill port. Also carried in each connector section is a strength member support to which is attached a plurality of ropes which carry the tensile load (towing load) from a connector section on one end of an array section to a connector section on the other end to thereby prevent mechanical loading of the wiring or the hose member. The strength member supports are urged by the tensile forces of the ropes against a retainer ring set in a groove in each connector section.

A collar member having internal threads and an inwardly directed flange is carried on one of the connector sections which has an adjacent external flange. The other connector section includes external threads, and when the sections are pushed together the threaded members are engaged, pulling the external and internally directed flanges together. Indexing means are used to prevent rotation of the bulkhead members within their respective connector sections and rotation of the connector sections relative to each other.

DESCRIPTION OF THE DRAWINGS

FIG. 1 is a sectional drawing of a connector made in accordance with my invention.

FIG. 2 is a plan view of a portion of the structure shown in FIG. 1.

DESCRIPTION OF THE PREFERRED EMBODIMENT

FIG. 1 is a cross-sectional view showing portions of two modules constituting parts of an elongated sonar array each terminating in a connector half, the halves being designed to fit together as set forth below. A length of acoustically transparent plastic hose 10 is telescoped over a portion of a male coupling member 12 and clamped thereto by means of a pair of clamp bands 14 and 16. Hose member 10 contains an array of sonar receiving equipment including hydrophones, wires, amplification and signal processing electronic equipment (not shown) connected by means of wires 18 to one part of an electrical connector 20. This part of electrical connector 20 is supported and carried in a bulkhead 22 which is fastened to coupling member 12 by means of a plurality of screws 24 (only one of which is shown in FIG. 1). When tightened, screws 24 act through washers 26 to pull a circular shoulder of bulkhead 22 against an internally directed flange 27 of coupling member 12 to thereby secure the bulkhead to the inside of coupling member 12. Fastened into ports in bulkhead 22 are a pair of oppositely directed check valves 28 and 30. An O-ring 32 provides a fluid-tight seal between bulkhead 22 and the inside wall of coupling member 12. Also positioned within coupling member 12 is a strength member support 34 to which is fastened a plurality of high strength ropes 36 of aramid fiber, only one of which is shown in FIG. 1. Strength member support 34 is prevented from movement toward the left under the stress of ropes 36 by means of a retaining ring 38 captured in an internal groove 40. A large flexible ring 42 acts as a spacer to limit movement of strength member support 34 between retaining ring 38 and bulkhead 22.

A second module shown includes a second length of acoustically transparent hose 44 clamped by means of a pair of clamp bands 46 and 48 over a cylindrical sleeve 51 forming part of a female coupling member 50. An O-ring seal 53 is placed in a groove in sleeve 51 to provide a fluid seal between coupling members 12 and 50. An index pin 52 fastened to male coupling member 12 engages a slot 54 in coupling member 50 to prevent undesired relative radial movement of the coupling members. Hose 44 contains or may contain the same type of sonar equipment as hose 10, said equipment being connected to wires 56 which are, in turn, connected to the opposite half of electrical connector 20. This half of connector 20 is carried in the central aperture of a bulkhead 58 which is fastened to an inwardly directed flange 60 of coupling member 50 by means of a plurality of screws 62 which tighten washers against flange 60. Bulkhead 58 also carries a fill screw 64 which, when the connector is disassembled, makes it possible to fill the module with a hydrocarbon acoustic fluid. An O-ring 66 provides a fluid-tight seal between this bulkhead and the internal wall of coupling member 50. Bulkheads 22 and 58 contain index pins 68 and 70, respectively, in suitable blind ports, which pins cooperate with notches in flanges 27 and 60 to prevent rotation of the bulkheads relative to each other or to coupling members 12 and 50. Carried in coupling member 50 is a strength member support 72 to which is fastened a plurality of high strength ropes 74 which are of aramid fiber or other suitable material having great tensile strength. As in the case of strength member support 34, a number of strength members are attached to support 72, only one of which is shown on the sectional view (FIG. 1). Strength member support 72 will be subjected to forces through ropes 74 which urge it toward the right against a retaining ring 76 carried in a groove 78. A flexible ring 80 acts as a spacer to prevent or minimize axial movement of strength member support 72.

Coupling member 50 carries a shoulder 82 which cooperates through a small wire shear ring 83 with an inwardly extending shoulder 84 on a threaded locking ring member 86. The internal threads on locking ring 86 engage external threads on coupling member 12, and as more threads are engaged, shoulder 84 is caused to be pulled axially tightly against shear ring 83 which, in turn, is compressed against shoulder 82 thereby holding coupling members 12 and 50 tightly together. Adjacent locking ring member 86 is a flexible spacer 88 which is split, making it easily removable when it is desired to decouple the assembly. When in position, spacer 88 prevents locking ring 86 from backing off of coupling member 12 through vibration or strumming of the array.

FIG. 2 is a plan view of strength member support 34 (72 is identical) showing the central aperture 34a which supports the electrical connector and a plurality of grooves 89 which receive loops of the aramid fiber rope 36, thereby forming a capstan-like structure. The shoulder of member 34 which abuts against retaining ring 38 is shown in dotted outline in this view.

With the structure described herein, the towing forces may be of the order of 400 kilograms for several coupled array sections towed at 25 knots. When placed in the water at depth, water pressure tends to force hose members 10 and 44 inwardly to a smaller diameter, forcing some of the dielectric fluid axially through check valve 30 and corresponding check valves in other connectors, such as one at the opposite end of hose 44. This permits substantial equalization of the forces across bulkheads 22 and 58 which is desirable since, if the bulkheads must withstand the full water pressure at depth, they would have to be much stronger and, hence, heavier. Thus the pressure is largely equalized across the bulkheads, some of the dielectric fluid flowing through check valve 30 within the interior of hose 10 to the interior chamber 90 of the connector. When the external pressure is reduced and the hoses expand, some of the fluid will be drawn back into the hoses through check valve 28 and corresponding check valves in other connectors.

I claim:

1. A connector assembly for electrically and mechanically connecting two elongated sonar arrays, each array including a length of flexible hose, electrical wiring, and hydrocarbon dielectric material in said hose, said arrays being adapted to be towed through the water at substantial depths, said connector assembly including telescoping male and female connector sections;

characterized in that each of said connector sections includes an elongated cylindrical extension to which said flexible hose is clamped, and first and second internal flanges and a groove adjacent each of said flanges, one of said connector sections including a large diameter portion carrying external threads and the other of said connector sections having an outwardly directed flange at its end opposite said cylindrical extension, lightweight bulkhead members each having a centrally located port positioned in each of said connector sections and means securing said bulkhead members to each of said first internal flanges, oppositely directed check valves in one of said bulkhead members effective to limit the pressure drop across said bulkhead member, a fill port in the other of said bulkhead members and means for opening and closing said port, strength member supports positioned in each of said connector members in contact with each of said second internal flanges and retainer rings in said grooves adjacent said second internal flanges to prevent axial movement of said strength member supports, a plurality of high strength rope members attached to each of said strength member supports which, when under load, tend to pull said strength member supports against said retainer rings, mating electrical connector halves positioned in each of said centrally located ports, flexible spacer means positioned between said bulkhead members and said strength member supports in each of said connector sections, a collar having internal threads and an internally directed flange carried on said other connector member adjacent said outwardly directed flange and a shear ring positioned between said internally directed flange and said outwardly directed flange such that when said collar is threadedly engaged with said one connector section, said outwardly and inwardly directed flanges are pulled together against said shear ring.

2. A connector assembly as claimed in claim 1 wherein an index pin is located between said connector sections to prevent relative rotation between said connector sections.

3. A connector assembly as claimed in claim 1 wherein index pins are positioned between said internal flanges and said bulkhead members to prevent relative rotation between each of said bulkhead members and its corresponding connector section.

4. A connector assembly as claimed in claim 1 wherein said male connector section includes a small diameter section telescoping within said outwardly directed flange of said female connector section and fluid seal means providing a liquid seal between said connector sections.

5. A connector assembly as claimed in claim 1 wherein each of said grooves adjacent each of said flanges includes sealing means providing a liquid seal between each of said bulkhead members and its corresponding connector section.

6. A connector assembly as claimed in claim 4 wherein flexible spacer means is positioned in each of said connector sections between its corresponding bulkhead section and its strength member support and indexing means are provided to prevent relative radial movement between said connector sections and between said bulkhead members and their corresponding connector sections.

* * * * *